No. 769,602.

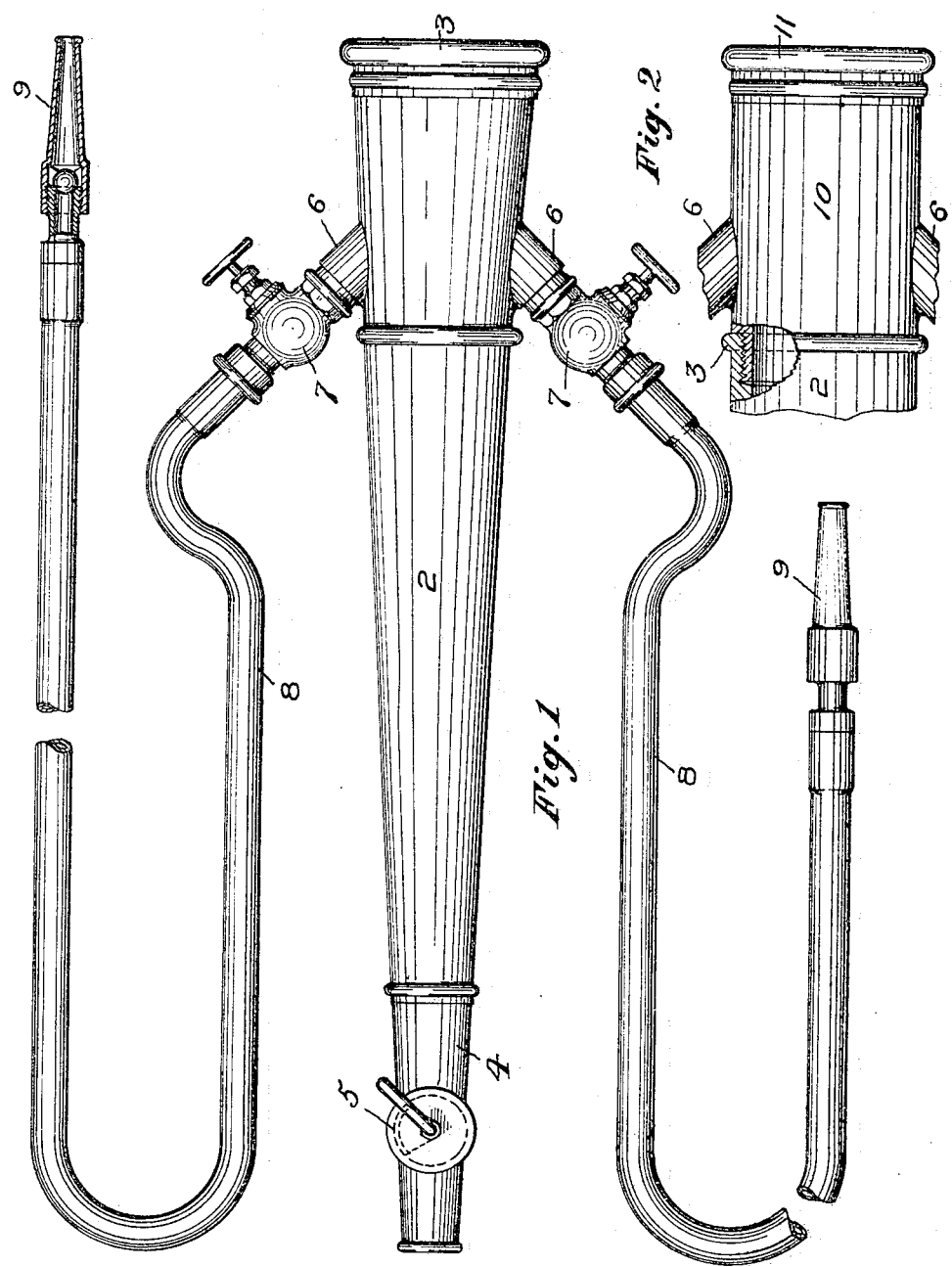

Patented September 6, 1904.

UNITED STATES PATENT OFFICE.

DANIEL FISHER, OF OIL CITY, PENNSYLVANIA, ASSIGNOR TO HERBERT H. FISHER, OF SWISSVALE, PENNSYLVANIA.

HOSE PIPE OR NOZZLE.

SPECIFICATION forming part of Letters Patent No. 769,602, dated September 6, 1904.

Application filed April 9, 1904. Serial No. 202,363. (No model.)

*To all whom it may concern:*

Be it known that I, DANIEL FISHER, a citizen of the United States, residing at Oil City, in the county of Venango and State of Pennsylvania, have invented certain new and useful Improvements in Hose Pipes or Nozzles, of which the following is a specification, reference being had therein to the accompanying drawings.

This invention relates to hose pipes or nozzles for fire apparatus; and the primary object is to provide the nozzle with one or more valved connections (preferably relatively small) to which hose may be attached, whereby a single nozzle may be utilized for attacking a fire in several places at the same time.

It frequently occurs that the stream thrown by the large main nozzle is excessive and unnecessarily destructive of property. Furthermore, fires are frequently located in partitions, closets, between floors, and in other places which are inaccessible to the main nozzle, and as the latter requires the combined efforts of two or more men to hold and direct it when under a full head of pressure the difficulty experienced in manipulating it in inconvenient and out-of-the-way places is often very great. An incipient fire may in many cases be reached and quickly extinguished by use of a small hose easily managed by one man without soaking and destroying adjacent property, where with only the large hose-pipe available the fire would be reached only with great difficulty, if at all, and extinguished after more damage had been done by water than by fire. In many instances it would be found advantageous to attack the fire with two or more streams from the same hose-pipe which might be directed to different portions of the building or the main stream might be used to advantage on the outside and the smaller stream or streams on the interior.

The present invention is designed to provide a hose pipe or nozzle by means of which all of these desirable results may be accomplished without detracting from the utility of the hose pipe or nozzle when used alone.

In the accompanying drawings, Figure 1 is an elevation of a hose pipe or nozzle constructed in accordance with my invention. Fig. 2 is a detail view illustrating a modification.

Referring to the drawings, 2 designates the body of hose pipe or nozzle, adapted to be coupled to hose at its rear end 3 in usual manner, and at its front end provided with tip 4, carrying shut-off 5. The form of tip and shut-off are unessential so far as the present invention is concerned, it being only necessary that some form of shut-off be provided in the forward portion of the pipe.

Secured to or formed integral with the rear portion of the pipe are one or more preferably relatively small branches 6, two being here shown and arranged opposite each other. These branches are provided with valves 7, and adapted to unite with each is a small hose 8, which may be made in sections in the usual manner and extended to any desired length. The outer end of this small hose is provided with a nozzle 9, which is preferably so constructed that it may be opened or closed, a common form of such nozzle being here shown.

Instead of extending branches 6 from pipe or nozzle 2 they may be carried by a fitting 10, which may connect with the inner end 3 of the pipe, with the fitting adapted at its rear end 11 to receive the hose. Such a construction is shown in Fig. 2, and by means thereof the present invention may be applied to hose-pipes now in general use. While I have here shown this fitting applied to the rear end of the nozzle, it will be understood that the same may be inserted between sections of hose (not shown) at the rear of the main nozzle without departing from the spirit of the invention. I prefer, however, to have the branches extend directly from the main hose-pipe so as to be always in position for use without adding materially to the weight of the pipe and without making it too heavy and cumbersome.

In use one or more of the smaller hose may be attached upon reaching the fire, and the same may be used alone, with shut-off 5 closed, or in conjunction with the main nozzle either on the inside or outside of the building, as may be found necessary. If desired, three or more of these branches may be provided, and as each of the smaller hose may be readily handled by one man it is obvious that the fire may be attacked at several points at the same time and in many instances with far greater effect and with less destruction of property than though the main hose-pipe were alone available.

In those cases where the pressure of water is comparatively low the streams directed by the smaller hose will be far more effective than that passing through the large hose-pipe, and while I prefer to have branches 6 and hose 8 of small diameter as compared with the diameter of the larger hose I do not restrict myself in this regard.

Although I have secured the best results by arranging valves 7 as here shown, it is obvious that a different arrangement may be adopted without departing from the spirit and scope of the invention.

I claim as my invention—

1. A fire-hose-pipe nozzle provided with a shut-off and adapted at its rear end to unite with a line of hose, an auxiliary hose connection carried by and tapping the nozzle between the rear end thereof and the shut-off, and a valve for said connection.

2. A fire-hose-pipe nozzle provided with a shut-off, valved outlets projecting therefrom at the rear of the shut-off, and auxiliary hose adapted to unite with the valved outlets.

3. A fire-hose-pipe nozzle provided with a shut-off, lateral branches 6 projecting therefrom at the rear of the shut-off, and valves 7 uniting with said branches and adapted to connect with auxiliary hose.

4. A fire-hose-pipe nozzle provided with a shut-off, lateral branches 6 projecting from the nozzle at the rear of the shut-off and of smaller diameter than the nozzle, valves uniting with the lateral branches, and auxiliary hose adapted to couple with the valves.

5. A discharge for fire-hose adapted to connect thereto and open for the passage of the main stream issuing therefrom, and valved branches of relatively small diameter extending from the said discharge and adapted to connect with relatively small hose.

6. The combination of a main hose pipe or nozzle, and a branch leading therefrom and adapted to unite with an auxiliary hose.

7. A main hose pipe or nozzle provided with a shut-off, and a relatively small valved branch extending from the hose-pipe at the rear of the shut-off and adapted to unite with a relatively small hose.

8. The combination of a hose pipe or nozzle, a shut-off therefor, a valved branch outlet permanently secured to and carried by the hose-pipe, and an auxiliary hose adapted to connect with the valved branch.

In testimony whereof I affix my signature in presence of two witnesses.

DANIEL FISHER.

Witnesses:
  J. D. TRAX,
  WM. M. PARKER.